`3,156,576`
ISOCYANATE MODIFIED PIGMENTS
Theodore A. Te Grotenhuis, Olmsted Falls, Ohio
(524 Bulkley Bldg., Cleveland, Ohio)
No Drawing. Original applications Oct. 12, 1951, Ser. No. 251,152, now Patent No. 2,780,612, dated Feb. 5, 1957 and Mar. 19, 1952, Ser. No. 277,547, now Patent No. 2,780,611, dated Feb. 5, 1957. Divided and this application July 30, 1956, Ser. No. 600,727
21 Claims. (Cl. 106—308)

This application is a division of my application Serial No. 277,547, filed March 19, 1952, now Patent No. 2,780,611, and of my application Serial No. 251,152, filed October 12, 1951, now Patent No. 2,780,612, both of which applications are continuations-in-part and were copending with my application Serial No. 714,919, filed December 7, 1946, now Patent No. 2,610,167.

In accordance with my invention, various pigments, such as carbon black, finely divided silica, titanium dioxide, and the like, are treated with a hydroxy-reactive compound to provide reactive surfaces for incorporation into silicon elastomers.

The active surfaces are provided in accordance with the invention herein by treating the pigments with one or more compounds free of polar groups capable of reacting with an isocyanate and having, or capable of forming compounds having, more than one carbon containing group capable of readily reacting by addition or condensation with alcoholic hydroxyl group to form a new and additional carbon-oxygen bond and further characterized by having the carbon of that group connected by two valence bonds to nitrogen or other carbon. Compounds of the greater reactivity and hence preferred are those having at least one —X=C=Y group where X is a member of the class consisting of —C and N and where Y is a chalcogen (preferably a member of the group consisting of oxygen and sulfur although selenium and tellurium may also be used to some extent) or —NR group where R is hydrogen or a monovalent hydrocarbon. Of the various compounds suitable, those having at least one and preferably more than one isocyanate (including isothiocyanate) groups appear to be most reactive. These materials can provide one or more —NCO, —NCS, —C=CO, and —C=CS groups for interaction with the hydroxyl of a silicon elastomer or silicon oil in substantially the same manner as is provided by the hydroxyl-reactive organosilanes, now specifically claimed in my above-mentioned copending application.

The pigment having surfaces treated in accordance with the present invention may be incorporated into the silicon rubber either before or after it is prepared. Thus, the treated pigment may be mixed into monomeric materials used in forming the elastomer where they are in the liquid state and retained therein during the subsequent polymerization condensation reaction.

The surfaces of most pigments including even carbon black surprisingly contain surfaces (apparently hydroxyl or carboxyl groups) which are capable of reacting with the organic compounds containing the above groups as have the organic isocyanates and the like, to form a chemical linkage to the surface of the pigment, as evidenced by the fact that pigments suitably treated with such materials to provide only o r g a n i c hydrophobic groups over their surfaces are no longer wettable by water but will float thereon. When there is a plurality of hydroxyl-reactive groups in each molecule of treating material or when there is a bonding of a plurality of hydrophobic portions of molecules together, some of the hydroxyl-reactive groups may protrude from the pigment surface to form direct chemical bonds to other hydroxyl-containing materials.

In the preparation of rubbery silicone elastomers, it is desirable to have only monomeric materials that are capable of condensing bifunctionally, i.e., have only two groups that can combine with hydroxyl groups, so that the polymer will grow by condensation in only two directions and form long chains to give an elastic product. A compound with but one condensable or hydrolyzable group stops chain growth, and a compound with more than two such condensable groups, when present in a substantial amount, may cause cross linking with enhancement of hardness at the expense of rubbery properties. When the hydroxyl groups on the pigment surface are reacted with the silicone compounds containing only two hydroxyl reactive groups, direct attachment can obviously be had to the pigment particles only at the ends of polymer chains made up of the condensed bifunctionally reactive silicones. When the hydroxyl group on the pigment surface is reacted with compounds containing three or four hydrolyzable groups, or groups condensable or reactive with hydroxyl groups, even if one or two such groups are utilized for reaction with the pigment surface, these attached groups may still enter any part of bifunctionally growing chains. For this reason it is frequently desirable, even when the pigment is incorporated into the liquid polymerizable materials which are to form the silicone elastomers, to expose the pigment surface to the direct action of compounds having more than two groups capable of condensing with hydroxyl g r o u p s. Thus, it is desirable to contact the surface of the pigment with an organo triisocyanate when the pigment is later to be incorporated into the silicone monomer or silicon oil.

The treatment of the surfaces of the pigment or the condensation of the monomer in the presence of the pigment, or both, tend to saturate the adsorptive capacities of the pigment so that a curable rubber is obtained.

The pigments which provide the greatest improvement in properties of the elastomeric materials have relatively great surface areas and of all pigments the very high surface area silicas are preferred in that they give exceptional properties to the polymer when it is incorporated therein, in accordance with the present invention. Such finely divided silicas include the very finely divided silicas or silicious materials such for example as those prepared by burning ethyl silicate and collecting the residue by suitable electrostatic precipitation means. One may, however, also use iron oxide, titanium dioxide, calcium carbonates, as well as the other various complex calcium and silicic pigments, and also carbon black, which pigments have a surface area of 30 sq. meters per gram, and preferably more than 60 or 70 sq. meters per gram. Pigments with larger particle sizes, while they give some effect in accordance with the present invention, are not as effective as the finer particle size materials.

The isocyanates which are preferred, as aforementioned, may have one or preferably more isocyanate groups and/or equivalent isothiocyanate group attached to an organic group including alkyl groups of 1 to 12 carbon atoms, alkylene groups of 1 to 12 carbon atoms, alkylenyl groups (unsaturated divalent aliphatic groups), aryl groups such as phenene and naphthenyl groups, etc., cycloaliphatic and hetrocyclic groups. The organic groups should have neither hydroxyl nor amino substituents without greatly decreasing the effectiveness of the isocyanates. They may have other types of substituents however. Functional groups are not desired because of possibility for interaction. The isocyanates preferably have a general formula $R(NCX)_n$, where R is any organic group which is free of functioning groups reactive with isocyanates such as hydroxyl, carboxyl, amino and the like and X is sulfur or oxygen. R, however, may be any organic group devoid of groups which readily react with isocyanate or isothiosocyanate. Examples of suitable organo isocyanates include hexamethyl di-isocyanate, toluene di-isocyanate, benzene di-isocyanate, and the well-recognized equivalent isothioisocyanates, and the methylene di-isocyanate and ethylenyl di-isocyanate (having the formula $C_2H_2(NCO)_2$). One may also use vinyl isocyanate, allyl isocyanate, vinyl phenyl isocyanates, and other monoisocyanates having a homopolymerizable unsaturated group, whereby polyisocyanate may be formed in situ on the pigment surface. In place of the isocyanates which as used generically include isothiocyanates and mixed isocyanate-isothiocyanate compounds any of which are suitable providing the isocyanate groups are separate and distinct and which are the preferred and outstanding pigment treating materials for pigments to be used in silicon rubbers, etc. Other compounds having one and preferably more than one separate and distinct group of the general formula —Y=C=X, wherein Y is carbon or nitrogen and X is sulfur, oxygen or —NR where R is hydrogen or a monovalent hydrocarbon radical may be used. Examples of such other compounds are diketenes, dithioketenes, dicarbodiimides, diketenimines and unsaturated ketenes such as vinylketene may be used in place of the isocyanate compounds although the pigment treatment is somewhat less satisfactory because of the much slower reactivity generally involved with these compounds. Examples of these less reactive but usable compounds include ketene, vinyl ketene, vinylthio ketene, hexane-2,9-diketene

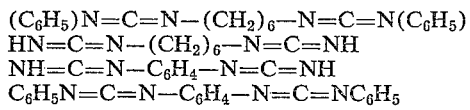

1,8-diacetyl, 1,8-diketenyl octane and the corresponding thioketenes, $(C_6H_5)N=C=N—(CH_2)_6—N=C=N(C_6H_5)$
$HN=C=N—(CH_2)_6—N=C=NH$
$NH=C=N—C_6H_4—N=C=NH$
$C_6H_5N=C=N—C_6H_4—N=C=NC_6H_5$ The pigment may be treated in accordance with the present invention by suitably subjecting the surface to complete contact with one or more of the above mentioned hydroxyl reactive compounds such as the isocyanate or compounds containing the aforesaid group or groups —Y=C=X under reactive conditions which may be at room temperature or elevated temperature, depending upon the reactivity of the particular compound and the length of time in which the treatment may be conveniently continued. It is generally preferable to contact the pigment with the reactive compound in vapor form if it is readily vaporizable or, if not, to dissolve the isocyanate or reactive compound in a solvent, such as a suitable hydrocarbon or anhydrous ether or chlorinated solvent, or any similar liquid which does not react with the isocyanate etc. or the pigment and which may be extracted from the pigment by volatilization. The pigment, either in the presence of solvent or after being suitably dried in the absence of material capable of reacting with the hydroxyl reactive group such as an isocyanate (or isothioisocyanate) group, may be incorporated into the silicon elastomers to obtain outstanding benefits during the subsequent vulcanization treatment.

The treated pigment is generally used in amounts of at least 5%, and may be present in some instances in amounts as large as several hundred percent of the weight of the silicon elastomer. The amount of pigment depends on the stiffness of the desired compound and the strength desired in the final compound, and follows the ordinary principles utilized in rubber compounding practices, as is well known in the art. Generally about 10% to 200% of pigment is used. Only a portion of the total pigment need be treated in accordance with the present invention to obtain substantial benefits, such as substantially increased tensile strength of the final vulcanizate. The vulcanization may be accomplished by any of the methods suitable for vulcanizing silicone rubbers, and generally accomplished by incorporating substantial amounts of strong free radical producing oxidizing agent, such as benzyl peroxide, into the pigmented elastomer and subjecting the same to elevated temperatures for a substantial period. Temperatures of 300° F. (149° C.) or more are usually used during vulcanization. The vulcanization procedure is well-known in the art and also forms no part in the present invention.

The following examples illustrate the invention.

Example 1

100 parts of a very dry finely divided silicious pigment obtainable under the trade name Santocel (a light porous form of silica aerogel) and having a surface area in excess of 50 square meters per gram is stirred into a 10% solution of toluene diisocyanate in anhydrous toluene. The slurry is heated at 75° C. to remove most of the excess liquid from the pigment and, without permitting the pigment to contact moisture, the treated pigment is immediately masticated into 200 parts of a commercially obtainable silicone rubber made up substantially of diorganosilicon oxide units linked together. The silicone-rubber-pigment mixture is thereupon combined with about 10 parts of benzoyl peroxide and shaped and cured into desirable form by heating at a curing temperature of about 400° F. (203° C.) for about 2 hours. The polymer thus cured is found to have properties considerably superior to those obtained with the same amount of pigment that had not been treated to provide active units for interaction with hydroxyl groups in the silicone rubber.

Example 2

A substantially equal amount of carbon black is substituted for the silicious pigment or finely divided silica of Example 1, other conditions being substantially the same. The results are similar except that the state of cure in the final article is somewhat less indicating that carbon black has some delaying action on the peroxide curing mechanism.

Example 3

About 100 parts of the finely divided well-dried titanium dioxide is treated with about 150 parts of a solution of vinyl isocyanate in anhydrous toluene. The mixture is allowed to remain about one to two days at room temperature and thereupon heated on a steam bath under vacuum for a sufficient time to remove most of the excess liquid. The treated pigment is then incorporated by mastication into about 200 parts of silicone rubber consisting essentially of diorgano silicon oxide units and containing the usual curing agents already dispersed therein. The product thus obtained is then molded in desirable form and cured in the mold for 2½ hours at about 350° F. (about 175° C.) to obtain a cured silicone rubber article having relatively high strength for silicon rubber-titanium oxide compositions.

In the above examples, the diisocyanate solution may be substituted in whole or in part by solutions of the other isocyanates listed above including ethylene diisocyanate, vinyl isocyanate, and the like may be used. Also, the other non-isocyanate compounds free of polar groups and having groups capable of reacting with hydroxyl to produce a new carbon-to-oxygen bond as above mentioned, while not as desirable and as effective as are the isocyanates, may also be used in place of these materials, especially when a longer reaction time is provided for reactivity with the pigment surface. The pigments in the above examples may be substituted by other pigments such for example as those mentioned previously as suitable for compounding silicone elastomers.

The silicone rubbers and the method of curing these rubbers forms no part of the present invention and may be substituted by other silicone rubbers or elastomers as such are obtainable. Any curing agents suitable for curing commercial silicone rubbers may be used.

The present invention permits the attainment of increased tensile strength in silicone elastomers which greatly increases their field of use. The shorter chain linkages with the least number of carbon-to-carbon bonds are usually preferred when the elastomer is to be subjected to highly elevated temperatures over considerable periods of time.

*Example 4*

100 parts of titanium dioxide are stirred into sufficient solution containing about 10% vinyl isocyanate and about 10% of toluene monoisocyanate. The amount of said solution is sufficient to easily wet the pigment, and the pigment is maintained in said solution with protection from atmosphere and moisture for about one week to permit interaction of the isocyanate with hydroxyl groups on the surface of the pigment. The slurry comprising pigment and solvent is then preferably subjected to elevated temperatures of a steam bath in order to eliminate most of the excess solvent. The temperature of a steam bath is generally recognized to be about 100° C. The treated pigment thus obtained is then stirred into a solution of an alkyd resin and drying oil of a type suitable for forming a good varnish film upon drying and hardening. The mixture thus obtained is thereupon emulsified in water comprising ammonia-casein as a protective colloid and a small amount of a surface active agent (.5 to 2%) such as an alkali metal soap or other surface active agent to provide a coating composition which when applied to surfaces and dried forms a film which has considerably more gloss than has the film produced in the same manner from pigments which are not treated to provide hydrophobic surfaces.

In place of the alkyd resin in the above example, one may utilize solutions of other condensation polymers such as synthetic phenolic resins and solutions or dispersions of the various elastomeric plastics such as styrene, vinyl chloride, copolymers of styrene and butadiene, and particularly those containing more than 50% of one or more styrenes etc., as well as other film-forming polymeric materials.

In place of the titanium dioxide in the last example, any other pigments such as those above described may also be used. The monoisocyanates having the general formula R—NCO, where R is selected from phenyl, ethyl, methyl, or other alkyl, aryl, or unsaturated aliphatic groups are usually preferred for the pigment treatments when the pigments are used in emulsions. When the material is polymerizable, as for example when a high molecular weight unsaturated polyester-styrene mixture is used as the binding material, an unsaturated polymerizable hydroxyl reactive organic compound as above described such as an unsaturated isocyanate or ketene etc. such as the butadiene isocyanate, allyl isocyanate, vinyl isocyanate, vinyl ketene, etc. are desirable for treatment of the pigment in order to form direct linkages to the polymerizable binding materials.

In application Serial No. 251,152, filed October 12, 1951, which issued as Patent No. 2,780,612, I disclosed the treatment of pigments and fibers, including glass fibers, with isocyanates to modify their surface characteristics for incorporation into resins and the like.

The term "pigments" is used herein in the generic sense to include granular or powdered inorganic solids generally for contact or admixture with resins and rubber regardless of whether or not the solids have tinctorial value.

It is to be understood that in accordance with the provisions of the patent statutes, variations and modifications of the specific invention herein shown and described for purposes of illustration may be made without departing from the spirit of the invention.

What I claim is:

1. A silicious pigment, which has freely mobile particles free of vehicle suitable for incorporation in rubbery polymers, having on surface portions thereof a residue from the treatment of said pigment with an amount of an organic isocyanate sufficient to render the pigment hydrophobic, said organic isocyanate having the general formula $R(NCO)_n$, where R is an organic group free of aliphatic unsaturation and functional groups and $n$ is an integer.

2. An inorganic pigment, which has freely mobile particles free of binder suitable for incorporation in rubbery polymers, having over surface portions thereof a residue from the reaction of the surface of said pigment with an amount of an organic polyisocyanate that renders the pigment hydrophobic, said polyisocyanate being free of aliphatic unsaturation and having a plurality of isocyanato groups attached directly to an organic group which is free of functional groups other than isocyanato groups.

3. A method of producing hydrophobic, organophilic pigments which comprises contacting surface portions of a pigment with a solution, in anhydrous solvent free of functional groups, of an organic compound having at least one isocyanato group attached to a saturated organic group which is free of functional groups other than isocyanato groups, and heating the pigment in contact with said organic compound at an elevated temperature to cause reaction of said isocyanato groups with groups on the pigment surface to render the same hydrophobic.

4. A finely divided free flowing inorganic solid pigment having on the surface thereof a residue from the treatment of said surface with a small amount of a saturated aliphatic organic monoisocyanate which is free of functional groups other than isocyanato groups, the amount of said organic monoisocyanate being sufficient to render the pigment hydrophobic and insufficient to bind pigment particles together.

5. A hydrophobic, organophilic pigment, the particles of which are mobile and free of binder and are coated with an amount of an organic monoisocyanate sufficient to render the particles hydrophobic and insufficient to bind the particles together, said monoisocyanate having the formula RNCX, in which R is a saturated aliphatic hydrocarbon radical and X is a chalcogen, the coating being bonded to the surface of the pigment by reaction through isocyanato groups.

6. A method of producing a hydrophobic, organophilic pigment which comprises slurrying the pigment in a solution of a saturated organic monoisocyanate in volatile anhydrous organic solvent, which is free of functional groups for reaction with said isocyanate, said organic monoisocyanate having the formula RNCO, in which R is a saturated aliphatic hydrocarbon radical, and heating the pigment above room temperature to develop the hydrophobic, organiphilic properties of the monoisocyanate.

7. A free-flowing, white inorganic oxide pigment, free of liquid and solid binder and suitable for incorporation in polymers, having over surface portions thereof a residue from the reaction of the surface of said oxide with a small amount of an organic isocyanate sufficient to render said surface hydrophobic, said organic isocyanate having the general formula $R(NCO)_n$, where R is an organis group free of aliphatic unsaturation and functional groups and $n$ is an integer, the amount of said organic isocyanate being insufficient to bind pigment particles together.

8. A method of producing hydrophobic, organophilic pigments which comprises contacting surface portions thereof with a dispersion in volatile anhydrous liquid, which is free of functional groups for reaction with isocyanate, of an organic compound having at least one isocyanato group attached to a saturated organic group which is free of functional groups other than isocyanato groups and heating the pigment to a temperature of 75° C. while in contact with isocyanate.

9. The method of producing a hydrophobic, organophilic pigment which comprises intimately associating with the pigment a small amount of a treating agent sufficient to render the pigment hydrophobic, said treating agent consisting of a monoisocyanate of the formula RNCO, in which R is an aliphatic hydrocarbon radical, and heating the pigment to a temperature of about 100° C. to develop the hydrophobic, organophilic properties of the isocyanate.

10. The method of producing hydrophobic, organophilic inorganic particles which comprises wetting surface portions of said particles with a solution of an organic monoisocyanate in volatile organic solvent free of functional groups for reaction with said isocyanates, heating the thus treated particles to an elevated temperature to remove solvent and to promote reaction between the hydroxyl groups normally on said particles and the isocyanato groups to thereby attach organic groups of said isocyanate to the surface of said particles to render the same hydrophobic.

11. A method according to claim 10 wherein said volatile solvent is a hydrocarbon.

12. The method of producing a hydrophobic, organophilic pigment which comprises intimately associating with the pigment a small amount of an organic monoisocyanate sufficient to render the pigment hydrophobic, said organic monoisocyanate having the formula RNCX, where R is any organic group free of functional groups and X is a chalcogen, and heating the pigment to a temperature of at least about 100° C. to develop the hydrophobic, organophilic properties of the pigment.

13. A hydrophobic inorganic particle suitable for incorporation in resinous materials and the like, portions of which are coated with a small but effective amount of a hydrophobic, organophilic treating agent consisting of a monoisocyanate of the formula RNCO, in which R is a hydrocarbon radical free of olefinic unsaturation, which coating has been bonded to the surface of the particles by reaction through the isocyanato groups.

14. A pigment according to claim 13 wherein R is a saturated aliphatic group.

15. A pigment according to claim 13 wherein R is an alkyl group to 1 to 12 carbon atoms.

16. A pigment according to claim 13 wherein R is an aryl group.

17. A pigment according to claim 13 wherein R is a phenyl group.

18. A pigment according to claim 13 wherein R is an alkyl group of at least 1 carbon atom.

19. The method of producing a hydrophobic, organophilic pigment which comprises intimately associating with the pigment a small but effective amount of a treating agent consisting of a monoisocyanate of the formula RNCO, in which R is an aliphatic hydrocarbon radical containing 6 to 12 carbon atoms, and heating the pigment at a temperature of about 100° C.

20. A method of producing hydrophobic, organophilic particles which comprises contacting surface portions thereof with an organic isocyanate in the gaseous state, said organic isocyanate being free of olefinic groups and free of functional groups other than isocyanato groups, and heating the particles while in contact with said isocyanate to promote reaction of isocyanato groups and hydroxyl groups on said particles to render the same hydrophobic.

21. A method according to claim 20 wherein said organic isocyanate is a monoisocyanate.

References Cited in the file of this patent

UNITED STATES PATENTS

| | | |
|---|---|---|
| 1,894,168 | Gardner | Jan. 10, 1933 |
| 2,036,570 | De Pew | Apr. 7, 1936 |
| 2,402,962 | Hill | July 2, 1946 |
| 2,663,650 | Iler | Dec. 22, 1953 |
| 2,705,206 | Wagner | Mar. 29, 1955 |
| 2,789,919 | Eastes et al. | Apr. 23, 1957 |

FOREIGN PATENTS

| | | |
|---|---|---|
| 885,875 | France | Sept. 28, 1943 |
| 1,092,695 | France | Apr. 26, 1955 |

OTHER REFERENCES

Page 198 of Diseren's "The Chemical Technology of Dyeing and Printing," New York (1948).